Figure 1:
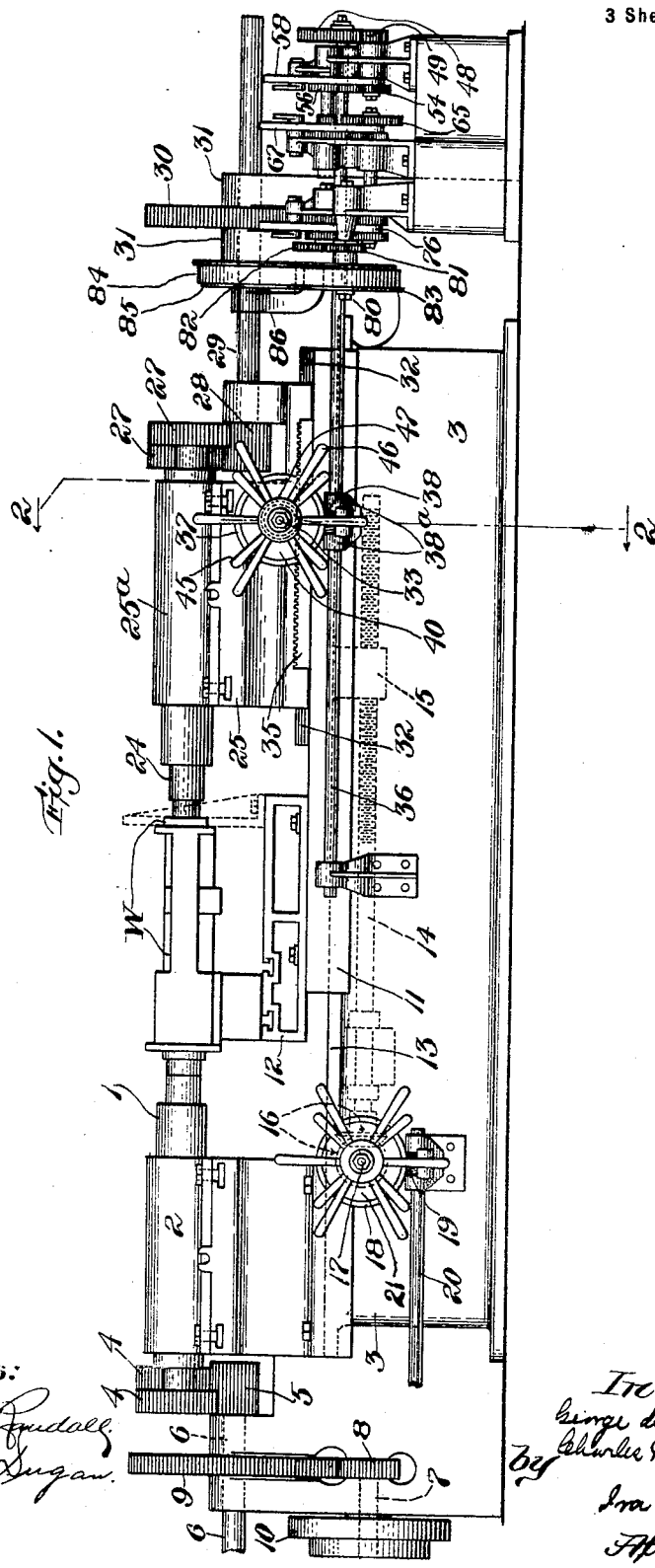

No. 703,660. Patented July 1, 1902.
G. DE LAVAL & C. W. CHISHOLM.
BORING MACHINE.
(Application filed May 9, 1901.)
(No Model.) 3 Sheets—Sheet 2.

Witnesses:
Arthur D. Randall
Katharine A. Dugan.

Inventors
George de Laval
Charles W. Chisholm
by Ira L Fish
Attorney.

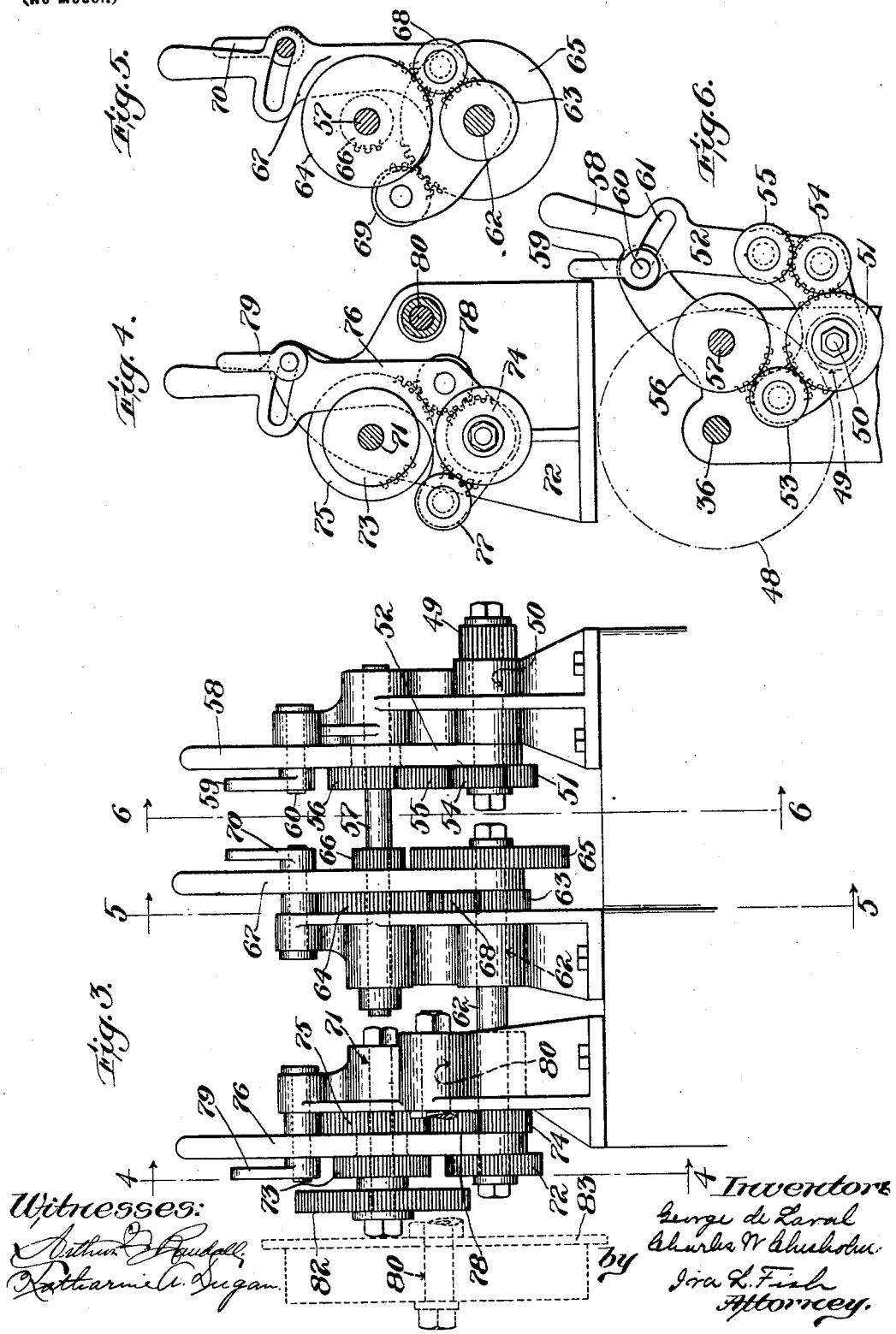

UNITED STATES PATENT OFFICE.

GEORGE DE LAVAL, OF CAMBRIDGE, AND CHARLES W. CHISHOLM, OF SOMERVILLE, MASSACHUSETTS, ASSIGNORS TO THE GEORGE F. BLAKE MANUFACTURING COMPANY, OF NEW YORK, N. Y., A CORPORATION OF NEW YORK.

BORING-MACHINE.

SPECIFICATION forming part of Letters Patent No. 703,660, dated July 1, 1902.

Application filed May 9, 1901. Serial No. 59,349. (No model.)

*To all whom it may concern:*

Be it known that we, GEORGE DE LAVAL, of Cambridge, and CHARLES W. CHISHOLM, of Somerville, in the county of Middlesex and State of Massachusetts, have invented certain new and useful Improvements in Boring-Machines, of which the following is a specification.

The invention relates to that class of boring-machines employed for boring cylinders and similar work in which the work is secured to a sliding carriage which is automatically moved forward during the boring to feed the work to boring-cutters carried by spindles mounted to revolve in a head-stock secured to the frame of the machine. In this class of machines the boring is done at the front end of the work, and if opposite ends of the work are to be bored the position of the work upon the carriage must be reversed, and if the bores in the opposite ends are to be of different diameters the cutters must be readjusted. These readjustments of the work or cutters or of both must be carefully and accurately made and consume considerable time, thereby reducing the production of the machine and increasing the cost of production.

The object of the present invention is to increase the capacity and production of machines of this kind, and this is accomplished by mounting a boring-spindle back of the work and providing feeding mechanism for automatically advancing said spindle during the advance of the work-supporting carriage, so that the cutters on the rear boring-spindle are fed through the work as the work is fed to the cutters on the front boring-spindles. With this construction the rear boring-spindle may act to bore the rear end of the work while the work is being fed to the front boring-spindle, and both ends of the work thus be bored with but one adjustment of the work and without changing the cutters in the boring-spindles. This greatly increases the rapidity of production, especially when a number of pieces of duplicate work are being produced.

The rear boring-spindle is preferably mounted upon the work-supporting carriage, as when so mounted it may be employed for carrying a facing-tool in case it is desired to face off the rear end of the work. In such case the spindle-carriage will be disconnected from the automatic feeding mechanism and will move with the work-carriage, but will not move forward with relation to the work.

The invention will be more fully understood by referring to the accompanying drawings, in which a boring-machine is shown embodying the invention in its preferred form.

Figure 2:
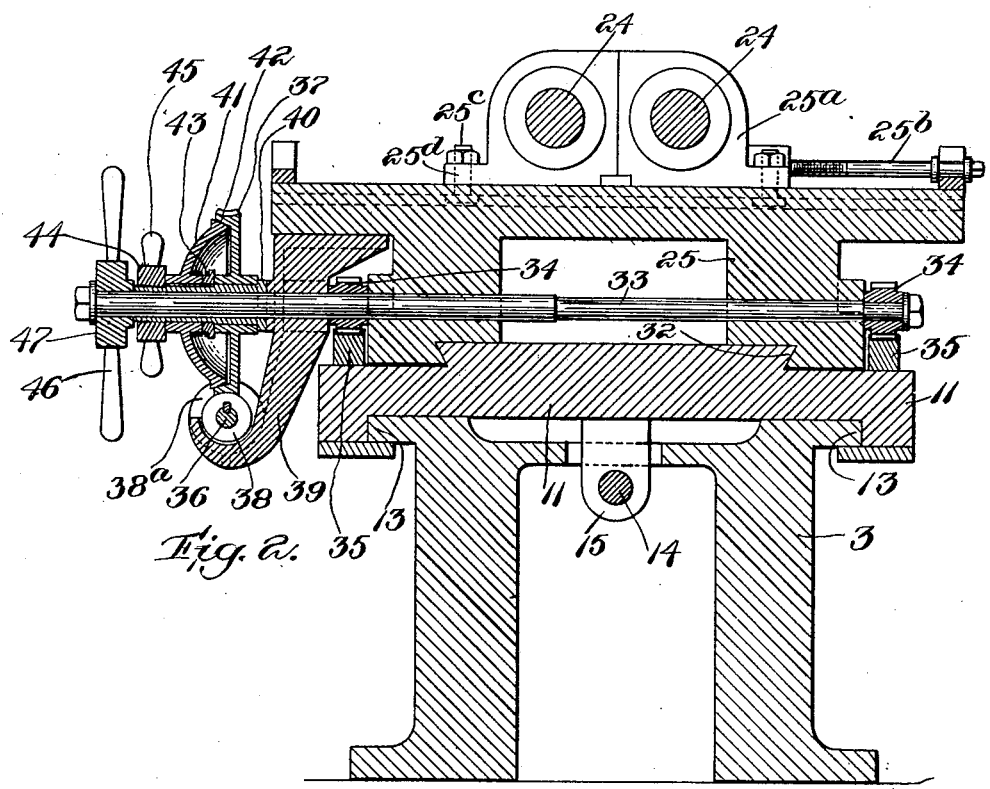

In the drawings, Figure 1 is a side elevation of the boring-machine. Fig. 2 is a cross-sectional view on line 2 2, Fig. 1. Figs. 3, 4, 5, and 6 are details of the rear spindle-feeding mechanism.

The machine illustrated in the drawings is a "duplex" machine, being provided with two sets of boring-spindles, which are duplicates of each other. The cutter-carrying boring-spindles 1 at the head of the machine are mounted to turn in a head-stock 2, secured to the frame 3 in the usual manner, and are driven in unison and in the same direction through gears 4, secured to the spindles and engaged by a gear 5, fast on a shaft 6, which is driven from a driving-shaft 7 through a pinion 8, secured to the shaft 7 and engaging a gear 9 on shaft 6, the shaft 7 being driven through pulleys 10 from a suitable countershaft. (Not shown.) The work to be operated upon, consisting, as herein shown, of a duplex pump-cylinder W, is carried by a sliding carriage 11, being secured by suitable holding devices to a plate 12, which is bolted to said carriage. The carriage is mounted on ways 13, formed on the frame 3, and during the boring operation is automatically advanced on said ways to feed the work toward the boring-cutters carried by the spindles 1 by suitable feeding mechanism. The mechanism shown for automatically feeding the carriage toward the head of the machine comprises a screw-rod 14, mounted in the frame and engaging a nut 15, secured to the carriage, the rod being connected by means of bevel-gears with a transverse shaft 17, mounted in the same and having mounted thereon a worm-wheel 18, which is engaged by a worm 19, secured to a shaft 20. The shaft 20 may be driven by any suitable gearing from the shaft—as, for instance, by gearing similar to that to be described in connection with the feeding mechanism of the rear spindle. The worm-wheel 18 is loosely mounted upon the shaft 17 and may be connected therewith or disconnected therefrom by means of a friction-disk 21, connected to turn with shaft 17 and adapted to be engaged with said worm-wheel by a nut having operating-arms 22. The specific construction of these connecting devices may be similar to the construction of the connecting devices shown in Fig. 2 and to be hereinafter more fully described.

During the boring operation the worm-wheel is connected with the shaft 17, and said shaft is driven from the shaft 20. When the feeding of the work is to be stopped, the worm-wheel is disconnected from the shaft 17, so that said wheel turns idly upon said shaft. When the worm-wheel is disconnected from the shaft 17, the shaft may be turned by hand to adjust or move the carriage in setting up or adjusting the work preparatory to the boring operation by arms 23, secured to the outer end of the shaft.

To give the machine the capacity of boring both ends of the work at the same time, cutter-carrying boring-spindles 24 are mounted in the rear of the work, and mechanism is provided for automatically advancing the rear boring-spindles to feed the boring-cutters through the work while the work is being fed to the cutters of the front boring-spindles 1. In the construction shown the boring-spindles 24 are mounted in bearings in a sliding carriage 25 and are driven in unison and in the same direction through gears 27, secured to the spindles and engaged by a gear 28, fast on a shaft 29, mounted in the carriage. The shaft 29 is driven through a gear 30, which is connected with said shaft by key and slot, so that the shaft may slide through the gear while being driven by it, the gear being held between two bearings 31 and being driven from a driving-shaft similar to shaft 7 through a pinion similar to pinion 8. (Not shown.)

It is preferred to mount the carriage 25 upon the carriage 11, as with such an arrangement the machine is given the capacity of doing a greater variety of work, as will be explained. In the construction shown the carriage 25 is mounted upon ways 32, formed on the carriage 11. The means for automatically advancing the carriage 25 to feed the cutters of the rear boring-spindles through the work comprises a shaft 33, mounted in the carriage and carrying two pinions 34, which mesh with racks 35, secured to the carriage 11, the shaft being driven from a shaft 36, mounted in bearings at the side of the frame 3. The shafts 33 and 36 are connected through a worm-wheel 37, connected with shaft 33, and a worm 38, splined on the shaft 36 and held between bearings 38$^a$, formed on a bracket 39, which is secured to the carriage 25. The worm-wheel is loosely mounted on the shaft 33 or upon a sleeve 40, secured to said shaft, and may be connected with or disconnected from the shaft through a friction-disk 41, keyed to slide on the sleeve 40 and arranged to engage a friction-surface 42 on the worm-wheel. The disk 41 is forced away from the worm-wheel by a spring 43 and may be forced into engagement with the worm-wheel or released therefrom by the action of a nut 44, screw-threaded on the sleeve 40 and provided with operating-handles 45, by which it may be turned in either direction.

During the boring operation the disk is engaged with the worm-wheel and the shaft 33 is constantly driven from the feed-shaft 36, thus causing the pinions 34 to travel along the racks 35 and advance the carriage 25 with relation to the work as the work-carriage 11 feeds the work to the front boring-spindles. When the action of the rear boring-cutters is to be arrested, the disk 41 is disengaged from the worm-wheel 37 by turning the nut 44, and the worm-wheel then turns idly about the shaft 33. When the worm-wheel is disconnected from the shaft 33, the shaft may be turned to move the carriage, as in setting up or adjusting the work preparatory to boring, by handles 46, projecting from a collar 47, secured to the outer end of the shaft 33.

In doing some classes of work it is desirable to face off the end of the cylinder while it is secured to the work-carriage, and with the construction shown this may be done by disconnecting the feed for the rear boring-spindles and mounting facing-cutters upon the spindles. As the carriage 25 is mounted upon the carriage 11, the facing-cutters may be adjusted to act upon the end of the work, and then the carriage 25 may be secured in position upon carriage 11 by any suitable means, (not shown,) so that the two carriages will move forward together and the relative positions of the carriage 25 and the work will not be changed as the work is fed to the cutters of the spindles 1. With the machine thus adjusted and operated the front end of the work may be bored and the rear end of the work faced off simultaneously.

Any suitable form of gearing may be employed for driving the shaft 36, and it is preferred to employ a variable-speed mechanism by which the shaft may be driven at any one of a number of different speeds, and it is also preferred to provide this mechanism with means for reversing the direction of rotation of the shaft 36, so that the carriage 25 may be returned or fed back away from the work automatically, if desired. The mechanism shown for driving the shaft 36 is a simple and efficient form of such a mechanism. In the construction shown a gear 48 is secured to the end of the shaft 36 and is engaged by a pinion 49 on a shaft 50, to which a gear 51 is also secured. A lever 52 is pivoted on the shaft 50 and carries two pinions 53 and 54, meshing with the gear 51, and also a third pinion 55, meshing with the pinion 54. Pinions 53 and 55 are so arranged that by swinging the lever 52 about shaft 50 either one or the other may be engaged with a gear 56, secured to a shaft 57, which may be rotated at various speeds in the same direction. When the pinion 53 meshes with gear 56, the shaft 50 is driven in the same direction as shaft 57, and when pinion 55 meshes with gear 56 shaft 50 is driven in the opposite direction. The lever may be shifted to engage either the pinion 53 or the pinion 55 with gear 56 through a handle 58 and may be held in either position by a binding-lever 59, screw-threaded on a stud 60, projecting through a slot 61 in the lever 52. The shaft 57 is driven from a shaft 62 through either a pinion 63, secured to shaft 62, and a gear 64, secured to shaft 57, or through a gear 65, secured to shaft 62, and a pinion 66, secured to shaft 57. A lever 67 is pivoted on shaft 62 and carries a pinion 68, meshing with pinion 63, and a pinion 69, meshing with gear 65. By turning the lever about shaft 62 the pinion 68 may be brought into engagement with gear 64, so that shaft 57 is driven at a slower speed than shaft 62, or pinion 69 may be brought into engagement with pinion 66, so that shaft 57 will be driven at a higher rate of speed than shaft 62, and the lever 67 may be held in either position by binding-lever 70. The shaft 62 is driven from a shaft 71 either through gears 72 73 or through gears 74 75, the gears 72 and 74 being secured to shaft 62 and gears 73 and 75 being secured to shaft 71. A lever 76 is pivoted on shaft 62 and carries a pinion 77, which meshes with gear 72, and a pinion 78, which meshes with gear 74. By swinging the lever 76 about shaft 62 the pinion 77 may be engaged with the gear 73 or the pinion 78 may be engaged with the gear 75, and thus the shaft 62 may be driven at either of two speeds from shaft 71. The lever may be held in either position by a binding-lever 79. The shaft 71 is driven at a constant speed from a driving-shaft 80, which carries a pinion 81, meshing with a gear 82, secured to shaft 71. The driving-shaft may be driven from a suitable counter-shaft through a pulley 83, secured thereto, or the shaft may be driven from shaft 29 by a belt 84, passing over pulley 83 and a pulley 85, splined on shaft 29 and held in position between bearing 31 and an arm 86.

With the driving mechanism described the shaft 36 may be driven at any one of four speeds by shifting the levers 67 and 76 and the direction of rotation may be changed by shifting lever 52.

The carriage 25 may be formed in two parts, and the upper part 25ª, in which the spindles are mounted, may be adjusted laterally upon the lower part by means of a screw 25ᵇ and be secured in adjusted position by bolts 25ᶜ and nuts 25ᵈ, as shown in Fig. 2.

With the machine described the boring may be simultaneously effected at both ends of the work and the cutters may be adjusted to cut the same or different-size bores. In boring a long cylinder the cutters on the front and rear boring-spindles may be similarly adjusted and the cylinder bored from both ends in half the time that would be required to bore the cylinder from one end only. In boring short cylinders two cylinders, or in a duplex machine four cylinders, may be secured to the work-carriage and the four cylinders be bored in the time which would ordinarily be required to bore two cylinders.

What we claim, and desire to secure by Letters Patent, is—

1. In a boring-machine the combination with a front boring-spindle, of a work-carrying carriage, mechanism for automatically advancing said carriage to feed the work to the cutters carried by said front spindle, a rear boring-spindle, and mechanism for automatically advancing said rear spindle to feed the cutters carried by said spindle through the work as it is being fed, substantially as described.

2. In a boring-machine the combination with a front boring-spindle, of a work-carrying carriage, mechanism for automatically advancing said carriage to feed the work to the cutters carried by said front spindle, a sliding carriage mounted upon said work-carriage, a boring-spindle mounted in said sliding carriage, and mechanism for automatically advancing said sliding carriage on said work-carriage to feed the cutters carried by the rear spindle through the work as it is being fed, substantially as described.

3. In a boring-machine, the combination with a front boring-spindle, of a work-carrying carriage, feeding mechanism therefor, a carriage mounted to slide on the work-carriage, a boring-spindle mounted in said sliding carriage, mechanism for automatically moving said sliding carriage with relation to the work during the feed of the work-carriage, substantially as described.

4. In a boring-machine, the combination with a front boring-spindle, of a work-carrying carriage, feed mechanism therefor, a carriage mounted to slide on the work-carriage, a boring-spindle mounted in said sliding carriage, mechanism for automatically moving said sliding carriage with relation to the work during the feed of the work-carriage, and means for disconnecting said automatic feed mechanism, substantially as described.

5. In a boring-machine, the combination with a front boring-spindle, of a work-carrying carriage, feed mechanism therefor, a rear boring-spindle, automatic feed mechanism therefor and means for varying the speed of said latter feed mechanism, substantially as described.

6. In a boring-machine, the combination with a front boring-spindle, of a work-carrying carriage, feed mechanism therefor, a rear boring-spindle, automatic feed mechanism therefor, and means for reversing said latter feed mechanism, substantially as described, In testimony whereof we have affixed our signatures in presence of two witnesses.

GEORGE DE LAVAL.
CHARLES W. CHISHOLM.

Witnesses:
W. S. TISDALE,
JOHN J. FINLEY.